(12) United States Patent
You

(10) Patent No.: US 8,908,972 B2
(45) Date of Patent: Dec. 9, 2014

(54) ELECTRONIC DEVICE CAPABLE OF RECOVERING GARBLED CHARACTERS AND METHOD FOR RECOVERING GARBLED CHARACTERS

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 209 days.

(21) Appl. No.: 13/534,254

(22) Filed: Jun. 27, 2012

(65) Prior Publication Data

US 2013/0141457 A1 Jun. 6, 2013

(30) Foreign Application Priority Data

Dec. 6, 2011 (CN) .......................... 2011 1 0401180

(51) Int. Cl.
*G06K 9/00* (2006.01)
(52) U.S. Cl.
USPC ......................................................... 382/187

(58) Field of Classification Search
None
See application file for complete search history.

(56) References Cited

U.S. PATENT DOCUMENTS

2009/0276759 A1* 11/2009 Aoyama et al. ............... 717/124

* cited by examiner

*Primary Examiner* — Stephen R Koziol
*Assistant Examiner* — Amandeep Saini
(74) *Attorney, Agent, or Firm* — Novak Druce Connolly Bove + Quigg LLP

(57) ABSTRACT

An electronic device capable of displaying correct characters in place of garbled characters includes a storage unit, a control unit, and a display unit. The storage unit stores a number of garbled characters and identifiable characters associated with the garbled characters, and the identifiable characters are translated from original characters corresponding to the garbled characters. The control unit obtains any garbled character displayed on the display unit, determines whether the obtained garbled character matches a garbled character stored in the storage unit, if so, then the control unit controls the display unit to display an identifiable character in place of the garbled character.

3 Claims, 2 Drawing Sheets

ELECTRONIC DEVICE CAPABLE OF RECOVERING GARBLED CHARACTERS AND METHOD FOR RECOVERING GARBLED CHARACTERS

BACKGROUND

1. Technical Field

The present disclosure relates to electronic devices and, more particularly, to an electronic device capable of recovering garbled characters and a method of recovering garbled characters adapted for the electronic device.

2. Description of Related Art

Garbling of a character refers to a phenomenon in which an original character is turned into a different symbol that makes no sense. A garbled character may occur in an operating system when the original character is read using a character code different from the original character code or when a character code for reading the original character correctly is not prepared in the system.

Users can download a code converter (e.g., Microsoft Applocale Revision) for converting the character code in the system into a character code which allows the original characters to be displayed correctly. Although this type of code converter is useful, a new garbled characters recovering device is still needed.

BRIEF DESCRIPTION OF THE DRAWINGS

Many aspects of the present disclosure can be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
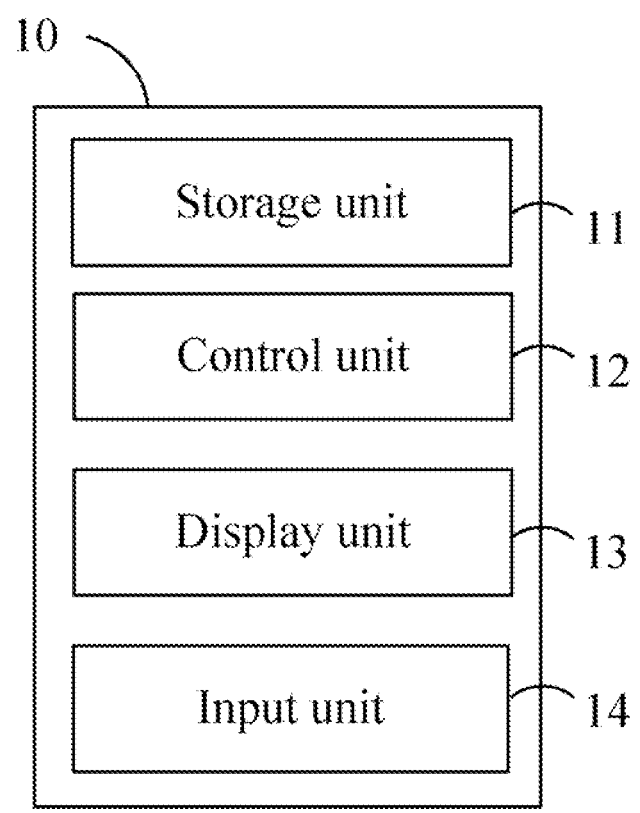
FIG. 1 is a block diagram of an electronic device capable of recovering garbled characters, in accordance with an embodiment.

FIG. 1 is a block diagram of an electronic device 10 capable of recovering garbled characters, according to an exemplary embodiment. The electronic device 10 may be a computer, a media player, or a mobile phone that can display a variety of characters, and the characters may be words, numbers, or letters included in software, webpage or text. The electronic device 10 may display at least one garbled character if a character code for reading the original character is not installed in the electronic device 10. Each displayed garbled character corresponds one-by-one to an original character.

In the embodiment, the electronic device 10 includes a storage unit 11, a control unit 12, and a display unit 13.

The storage unit 11 stores a variety of characters in garbled form (garbled characters) and identifiable characters associated with the garbled characters, and the identifiable characters are established from the original characters corresponding to the garbled characters that can be identified by the electronic device 10.

The control unit 12 obtains the garbled character from the display unit 13 if at least one garbled character is detected, and then determines whether the obtained garbled character matches a garbled character stored in the storage unit 11. If so, the control unit 12 controls the display unit 13 to display the identifiable character corresponding to the obtained garbled character at a location of the garbled character.

For example, it is known that the GB encoding scheme (e.g., GB 2312) is most often used for simplified Chinese characters, and Big5 is most often used for traditional Chinese characters. Therefore, the electronic device 10 which only includes the GB encoding scheme may not be able to display some traditional Chinese characters correctly. The incorrectly-displayed characters are garbled characters. In this case, the storage unit 11 pre-stores a variety of garbled characters and the identifiable simplified Chinese characters associated with the garbled characters, and the identifiable and correct simplified Chinese characters are translated from the original traditional Chinese characters corresponding to the garbled characters. After detecting at least one garbled character, the control unit 12 determines whether the detected garbled character matches a garbled character stored in the storage unit 11. If so, the control unit 12 controls the display unit 13 to display the identifiable and correct simplified Chinese character.

In the embodiment, the control unit 12 further extracts the obtained garbled character and then controls the display unit 13 to display the identifiable character instead of the garbled character. In an alternative embodiment, the control unit 12 may further generate a remark referring to the identifiable character(s) and control the display unit 13 to output the remark on a top layer overlapping the garbled character(s).

In the embodiment, the electronic device 10 further includes an input unit 14. The input unit 14 is configured to allow users to select one or more garbled characters displayed on the display unit 13. The control unit 12 then obtains the garbled characters displayed by the display unit 13 according to a selection made through the input unit 14. However, the electronic device 10 may automatically detect the displayed garbled characters, and such a determination and detection of garbled characters is known in the art, such as the subject matter of US Patent Application Publication No. 2008/0181504, which is herein incorporated by reference.

Figure 2:
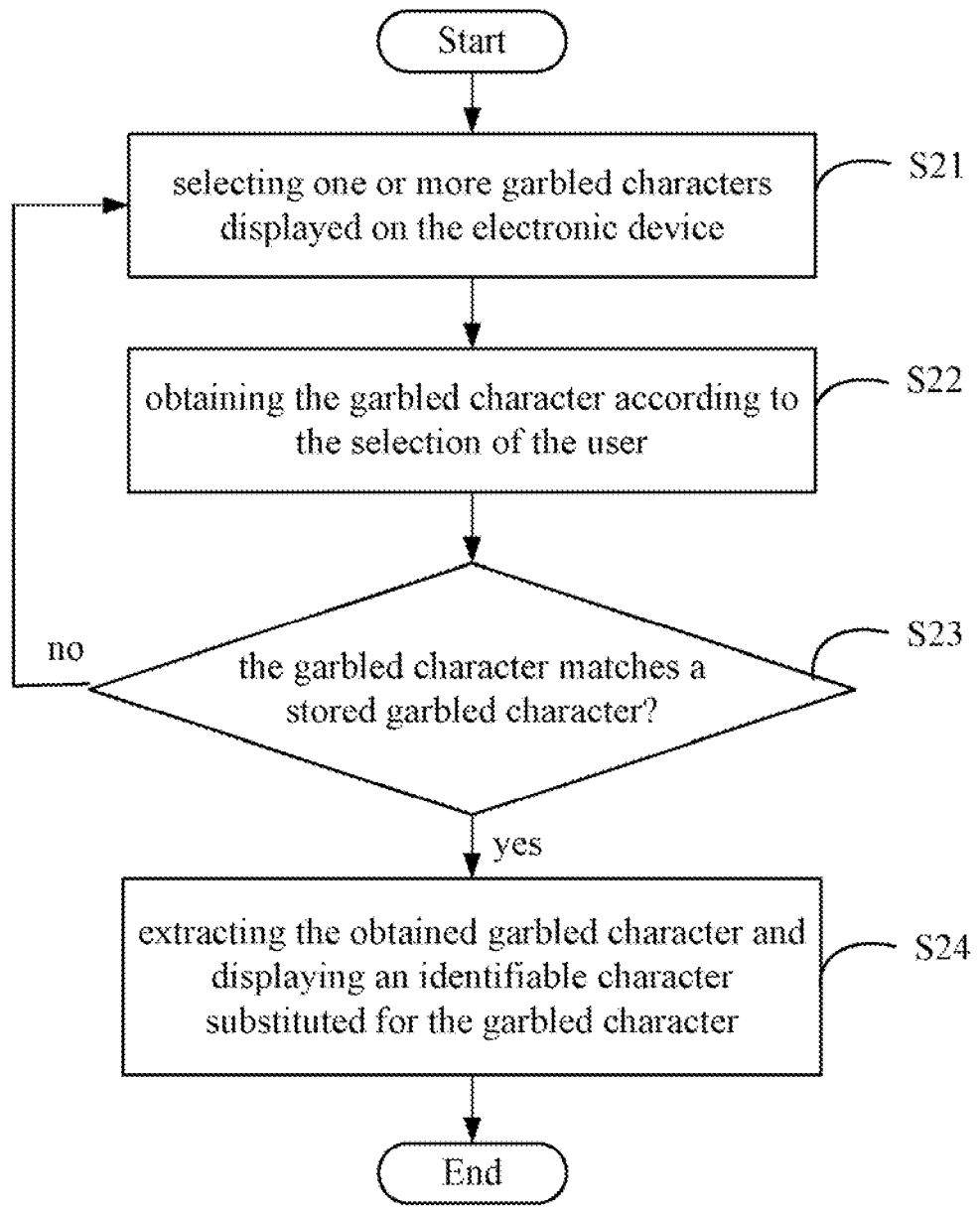
FIG. 2 is a flowchart of a method of recovering garbled characters, in accordance with an embodiment.

FIG. 2 is a flowchart of a method of recovering garbled characters implemented by the electronic device 10 of FIG. 1 according to an exemplary embodiment.

In step S21, through the input unit 14, a user selects one or more garbled characters displayed on the display unit 13.

In step S22, the control unit 12 obtains the garbled character according to the selection made through the input unit 14.

In step S23, the control unit 12 determines whether the obtained garbled character matches a garbled character stored in the storage unit 11. If so, then the procedure goes to step S24; otherwise, the procedure goes backs to step S21.

In step S24, the control unit 12 extracts the obtained garbled character and controls the display unit 13 to display the identifiable character substituted for the garbled character.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the appended claims.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for recovering garbled characters applied in an electronic device, the method comprising:

obtaining at least one garbled character displayed on the electronic device;

determining whether the obtained garbled character matches a garbled character stored in the electronic device, wherein the electronic device stores a plurality of garbled characters and identifiable characters associated with the garbled characters and are identified by the electronic device, and the identifiable characters are translated from original characters corresponding to the garbled characters; and displaying an identifiable character corresponding to the obtained garbled character at a garbled character location if the obtained garbled character matches the garbled character.

2. The method as described in claim 1, wherein the step displaying an identifiable character corresponding to the obtained garbled character at a garbled character location comprises:

extracting the obtained garbled character; and displaying the identifiable character in place of the garbled character.

3. The method as described in claim 1, wherein the step displaying an identifiable character corresponding to the obtained garbled character at a garbled character location comprises:

generating a remark referring to the identifiable characters; and outputting the remark on a top layer overlapping the garbled characters.

* * * * *